Dec. 1, 1925.
D. W. JOYNER
WAREHOUSE TRUCK
Filed June 12, 1925
1,563,863
2 Sheets-Sheet 1
Fig. 1.
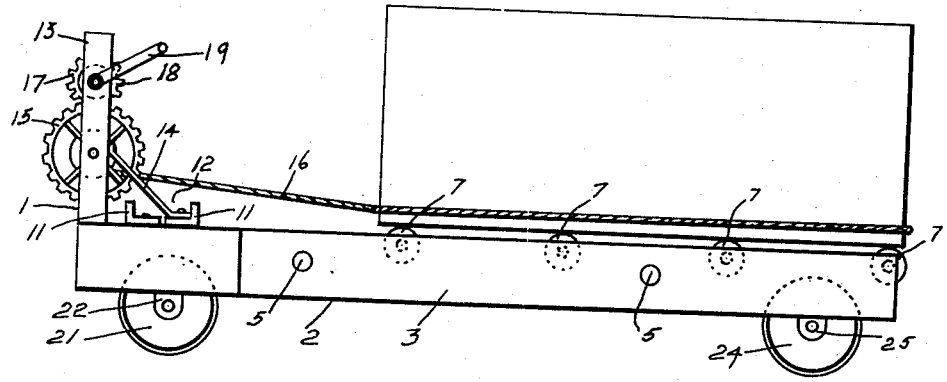
Fig. 2.
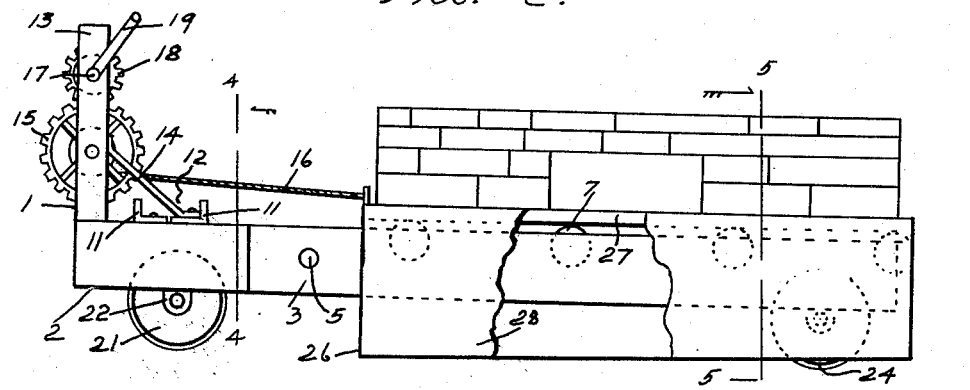
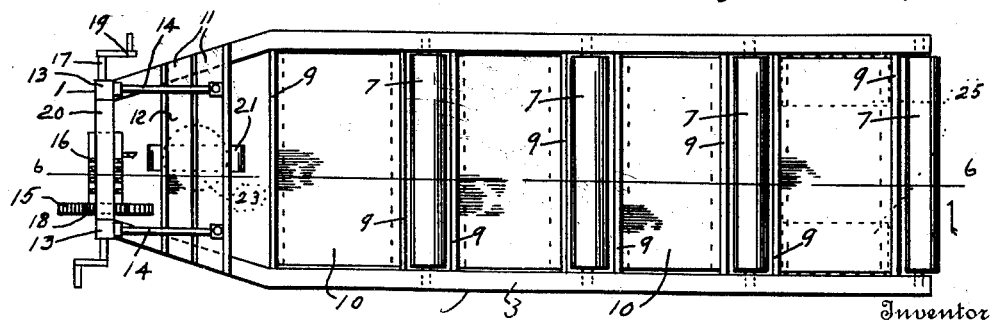
Fig. 3.
Inventor
Daniel Wright Joyner.
By M. C. Gillham.
Attorney Dec. 1, 1925.

D. W. JOYNER 1,563,863

WAREHOUSE TRUCK

Filed June 12, 1925

Inventor
Daniel Wright Joyner.

By M. C. Gillham.
Attorney

Patented Dec. 1, 1925.

1,563,863

UNITED STATES PATENT OFFICE.

DANIEL WRIGHT JOYNER, OF KANSAS CITY, MISSOURI.

WAREHOUSE TRUCK.

Application filed June 12, 1925. Serial No. 36,759.

*To all whom it may concern:*

Be it known that I, DANIEL WRIGHT JOYNER, a citizen of the United States, residing at Kansas City, in the county of Jackson and State of Missouri, have invented a new and useful Warehouse Truck, of which the following is a specification.

My invention relates to warehouse trucks and particularly to a three wheeled vehicle of this character which is used to transport heavy objects, such as safes, machines, apparatus, and packages.

The object of the invention is to simplify and improve the construction of a warehouse truck for which Letters Patent No. 1,479,612 were issued to me January 1, 1924, by the provision of an inclined truck bed to facilitate the unloading of the truck by the gravity of the load; by the provision of bearing wheels directly below the bed of the truck to permit the use of wheels of small diameter and to permit wider loads to be carried by the truck, thereby saving the expense of an underslung axle and, by the provision of a portable inclined platform body for the truck which may be loaded apart from the truck and then drawn with its load to place on the truck bed.

I attain these objects and other advantages by means of the structure and combination of parts illustrated in the accompanying drawing in which—

Figure 1 is a side elevation of a truck embodying my invention, the body being omitted, and showing the truck bearing a large object.

Figure 2 is a side elevation of the truck and its body bearing a load received apart from the truck, the side of the body being broken away to disclose the bearing of the platform on the rollers on the truck bed.

Figure 3 is a top plan view of the truck, the body being omitted.

Similar numerals of reference refer to corresponding parts throughout the several views.

Figure 4:
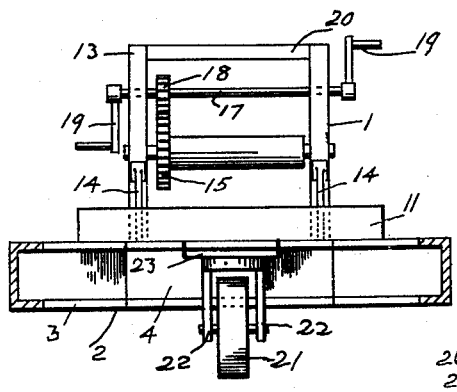
Figure 4 is a transverse section of the truck bed, on the line 4—4 in Figure 2.
Figure 5:
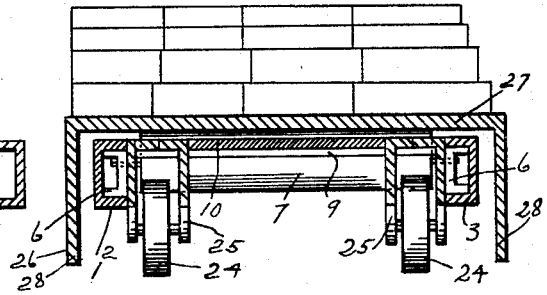
Figure 5 is a transverse section of the truck and its body, on the line 5—5 in Figure 2.
Figure 6:
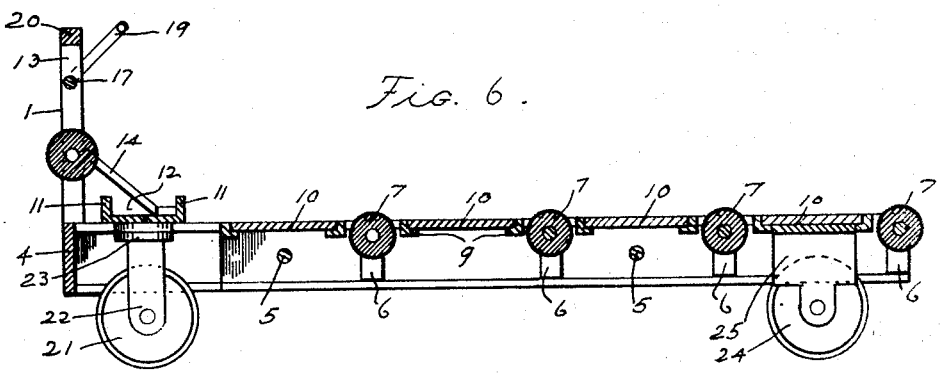
Figure 6 is a longitudinal section of the truck, on the line 6—6 in Figure 3, the body being omitted.
Figure 7:
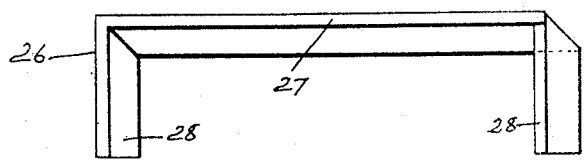
Figure 7 is a perspective view of the body, and showing the inclination thereof.

Referring to the drawings—the numeral 1 designates a warehouse truck constructed in accordance with my invention, and which comprises an elongated bed 2 having side members 3 and a front end member 4, all of which members are preferably made of channel iron, the channels in the side members being disposed in opposed parallel relation. Stay rods 5 are connected between the side members to hold the parts assembled. Bearing members 6 are mounted in the side members of the bed in opposed relation and in which are journaled transverse rollers 7, and in such a manner that they shall extend a little distance above the side members. The rearmost roller 7 also extends a little distance outwardly of the rearward end of the bed. The forward portions of the side members are formed to converge and an end member is connected between the ends of the converged portions. Spaced apart transverse angle irons are connected between the side members to form floor supports 9 and are disposed in opposed relation adapted to receive and support floor sections 10 of sheet metal. On the converged end portion of the bed are mounted transverse angle irons 11 in opposed parallel relation to, thereby, form a receptacle 12 for carrying tools and other material things pertaining to the truck. On the forward ends of the side members are mounted standards 13 which are braced by angularly disposed supports 14, and in the standards are journaled a winding drum having associated therewith a gear wheel 15, and on the drum is mounted a cable 16. A drive shaft 17 is journaled in the standards above the drum and is provided with a pinion 18 which is enmeshed with the gear wheel. On the outer ends of the drive shaft are crank handles 19 for imparting power to the drum. A cross bar 20 is connected between the upper ends of the standards. A bearing wheel 21 is journaled in the depending legs 22, on a pivotally mounted swiveling member 23 which is mounted centrally on the under side of the receptacle 12. At the rearward end of the bed are two oppositely disposed bearing wheels 24 and which are individually journaled in individual frames 25 mounted on the inner sides of the side members of the bed and which are made of angle irons disposed in opposed relation and connected between the rearmost angle iron floor supports 9. The bearing wheels 21 and 24 are mounted under the bed and, therefore, the wheels may be of small diameters to bear the bed at variable distances from the warehouse floor without using an underslung axle. The bed is preferably made to incline rearwardly, as shown in Figures 1 and 2, to provide for unloading the truck by the gravity of the load. A suitable inclination of the bed may be obtained by providing the pilot wheel with a greater diameter than the rear wheels, or by a specially constructed inclined bed. A portable body 26 having an inclined platform 27 and downwardly extending sides 28 is movably mounted on the rollers on the vehicle bed, the forward end of the body is of greater depth than the rearward end of the bed or truck when the body is standing apart from the truck, so that the truck may be backed a little distance therein.

In my former application which matured into the patent hereinabove identified, the bearing wheels were disposed outwardly of the truck and the width of the load was thereby limited in width. The bearing wheels in the instant case are positioned under the bed of the truck allowing wider loads and the use of the portable body. The position of small wheels allows the truck bed to be brought in close relation to the warehouse floor, so that the danger of elevating heavy objects to the truck and the cost of additional workmen to load the truck is practically eliminated. If a heavy object is to be transported by the truck, the body is removed and the object drawn over the rollers by the windlass and when the load is to be removed the gravity of the load will cause the object to gravitate to the rear of the truck, after the windlass is released and a pushing pressure applied to overcome the inertia of the load. While the truck is employed moving heavy loads the body of the truck may be loaded with packages and objects to be transported to the shipping dock or elsewhere. In this case, the rearward end of the truck is backed into the front end of the body and until the rearmost roller on the truck bed engages the inner side of the platform of the body, whereupon, the cable is attached to the body and the latter pulled upon and over the rollers to place, by the windlass, as shown in Figure 2. The provision of the inclined truck bed and its inclined portable body makes the loading and unloading of the truck possible with ease, safety, and dispatch. A frame may be combined with the portable body to receive loose materials.

Having described my invention what I claim is—

A warehouse truck, comprising a bed disposed in an inclined plane, a pivotally mounted pilot wheel bearing the forward end of said bed, independently mounted bearing wheels bearing the rearward end of said bed, a plurality of rollers journaled transversely of said bed and arranged to be turned by objects moved thereon, a portable body having an inclined plane platform movably mounted on said bed and bearing on said rollers, and pulling means mounted on said bed and adapted to pull said body over said rollers to load the truck and to regulate its travel on said rollers to unload the same.

Dated Kansas City, Mo., June 5th, 1925.

DANIEL WRIGHT JOYNER.